(12) United States Patent
Sripada et al.

(10) Patent No.: US 12,443,980 B1
(45) Date of Patent: Oct. 14, 2025

(54) TEXT AND IMAGE BASED PROMPT GENERATION

(71) Applicant: Amazon Technologies, Inc., Seattle, WA (US)

(72) Inventors: Sravan Sripada, Sammamish, WA (US); Guanglei Xiong, Pleasanton, CA (US); Yashal Shakti Kanungo, Seattle, WA (US); Tor Hamilton Steiner, Redmond, WA (US); Renuka Mannem, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/607,028

(22) Filed: Mar. 15, 2024

(51) Int. Cl.
  *G06Q 30/02* (2023.01)
  *G06Q 30/0202* (2023.01)
  *G06Q 30/0241* (2023.01)
  *G06T 11/00* (2006.01)

(52) U.S. Cl.
  CPC ..... *G06Q 30/0276* (2013.01); *G06Q 30/0202* (2013.01); *G06T 11/00* (2013.01)

(58) Field of Classification Search
  CPC . G06Q 30/0276; G06Q 30/0202; G06T 11/00
  See application file for complete search history.

(56) References Cited

U.S. PATENT DOCUMENTS

| | | | | |
|---|---|---|---|---|
| 2024/0203006 | A1* | 6/2024 | Pedersen | G06F 16/53 |
| 2024/0420453 | A1* | 12/2024 | Gupta | G06F 40/30 |

OTHER PUBLICATIONS

University of Chicago, Bayesian Ensemble Learning (Year: 2006).*
Alayrac, Jean-Baptiste et al., "Flamingo: a Visual Language Model for Few-Shot Learning", In Proceedings of Neural Information Processing Systems (NeurIPS) 2022, 54 pages.

* cited by examiner

*Primary Examiner* — Breffni Baggot
(74) *Attorney, Agent, or Firm* — Kilpatrick Townsend & Stockton LLP

(57) ABSTRACT

Techniques are described here for prompt generation. An example method can include determining, using a first machine learning model, a characteristic of an item based at least in part on a textual description of the item. The method can further include receiving a first input indicating a qualifier describing a theme for the image. The method can further include generating, using the first machine learning model, a prompt for a second machine learning model based at least in part on the characteristic and the background. The method can further include generating, using the second machine learning model, the image based at least in part on the prompt, the image associated with the theme and showing the item and the background.

20 Claims, 11 Drawing Sheets

500 ⇢

```
"""You will be acting as an expert creative designer for creating advertisement images for products.
You will respond after understanding the product and audience to highlight product's unique selling points.
Write down your thought process within <thought_process> tags.

Here are the product_details you will be provided:
   The title of the product
   List of features of the product
   The dimensions of the product
   Description of the product
   Product category
   The color of the product You should look at product_details to understand the product to find the customers,
and how they will use the product. Remember customers are always adults. \
   Based on product features and how customers will use the product, think about product's unique selling points
that can be represented through an image using the following instructions in <prompt_construction_instructions>
tag
   <prompt_construction_instructions>
   Do not modify the product
   Do not make any reference to moving the product
   Do not refer to any details about product or its parts.
   </prompt_construction_instructions>
   Based on unique selling points, fill out the following template <template> using instructions in <instructions> tag
   <instructions>
    Do not include any elaborate reasoning in descriptions
      Use <product_dimension> to obtain product dimensions. Do not place products greater than 26 inches on
table top.
 If <product_dimension> is missing do not use it.</instructions>
   <template>
     <Setting_Environment>
     Description of environment.
     </Setting_Environment>
     <Background>
     Details of what is behind the product. Colors, textures, and elements that complement or contrast with the
product.
     </Background>
```

```
    <Surface_Base>
    The surface upon which the product rests or mounted or is showcased. Material, color, and texture of the surface.
    </Surface_Base>
    <Surrounding_Elements_Props>
    Additional items or elements placed near the product.
    </Surrounding Elements & Props>
    <Lighting>
    The type, direction, and intensity of lighting used. How it highlights or shadows the product.
    </Lighting>
    <Mood>
    Any feelings to convey the mood.
    </Mood>
    </template>
  Next, using the template above write an image prompt for stable diffusion model within <diffusion_prompt> tag by following instructions within <prompt_instructions> tag.
    <prompt_instructions>
    Do not include brand name in diffusion_prompt
    Do not add detailed descriptions about the product
    Keep the diffusion_prompt succinct
    Do not include any reasoning
   Just describe the image
    If there is no surface mentioned in <Surface_Base> then ignore <Surface_Base>
    If there are no surrounding elements mentioned in <Surrounding_Elements_Props> then ignore <Surrounding_Elements_Props>.
     - diffusion_prompt must be a well constructed english sentence
     </prompt_instructions>
```

Following examples within <prompt_template> show how to construct diffusion_prompt from a template:

<prompt_template>
<example>
H: <text>
<template>
<Setting_Environment>
A sandy beach.
</Setting_Environment>
<Background>
Blurry beach landscape with blue water and light sand.
</Background>
<Surface_Base>
on smooth beige sand.
</Surface_Base>
<Surrounding_Elements_Props>
Seashells, starfish, sand dollars.
</Surrounding_Elements_Props>
<Lighting>
Soft natural sunset light.
</Lighting>
<Mood>
The mood is calm and relaxing.
</Mood>
</template>
</text>
A: <diffsion_prompt>
Product on smooth beige sand surrounded by seashells, starfish and sand dollars in a sandy beach. Blurry beach landscape with clue water and light sand in the background. Soft natural sunset light, calm, relaxing.
</diffusion_prompt>
</example>
<prompt_template>

Here are the product details. Let's start. Think step by step:
<product_details> <product_title>{product_title}</product_title>
<product_features> {bullets} </product_features>
<product_dimension> {product_dimension} </product_dimension>
<product_description> {product_description} </product_description>
<product_type> {product_type} </product_type>
<product_color> {dominant_color} </product_color> </product_details>

Remember to write down your thought process within <thought_process> tags. Remember, Start diffusion_prompt with "Product".
Assistant:

TEXT AND IMAGE BASED PROMPT GENERATION

BACKGROUND

A prompt can include an input that provides instructions to a generative machine learning model (also referred to as a generative artificial intelligence (AI) model or genAI) for generating an output. The prompt can include, for example, an image input, a text input, or an audio input that can guide the generative machine learning model toward a desired output. By refining the quality of a prompt, an output of the generative machine learning model can become closer to the desired output.

BRIEF DESCRIPTION OF THE DRAWINGS

Various embodiments in accordance with the present disclosure will be described with reference to the drawings, in which:

FIG. 5 is an illustration of conditions used to guide a prompt generation process, according to one or more embodiments.

FIG. 6 is an illustration of an example prompt for image generation, according to one or more embodiments.

FIG. 7 is an illustration of the example prompt for image generation, according to one or more embodiments.

DETAILED DESCRIPTION

Figure 1:
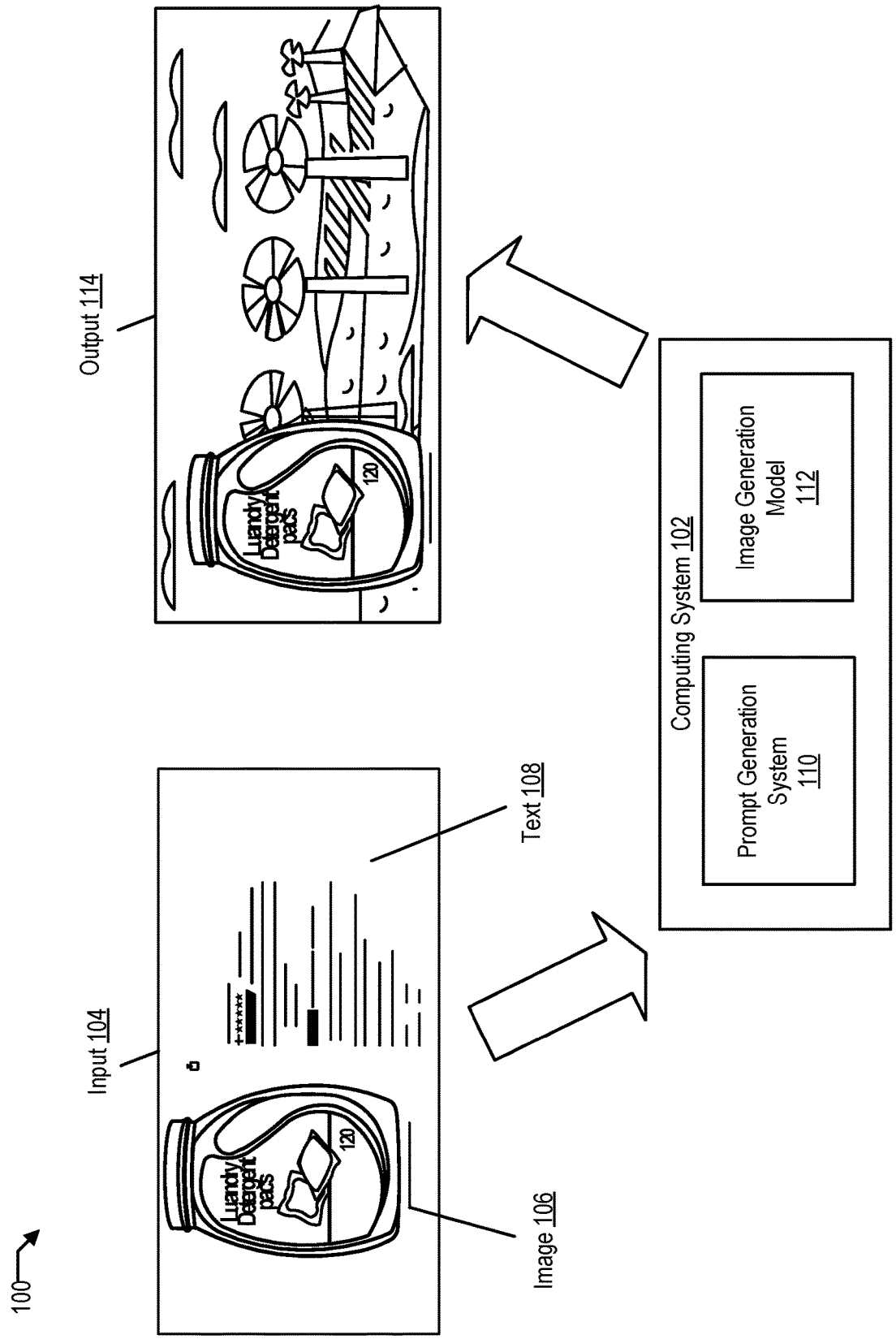
FIG. 1 is an illustration of an example system for generating a prompt for an image generating model, according to one or more embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

A generative machine learning model can be trained to process the data and generate new data. An example of a generative model is a large language model that is operable to receive an input and generate a textual response in natural language. Another example is an image generating model that can receive an input and output an image. For each of these generative models, the quality of the output can be dependent on a prompt that is provided to the model as the input. The prompt can guide the generative model to generate a desired output. Prompt engineering is the process of designing prompts for particular generative models to better produce desired outputs. In other words, the responsiveness of the generative model in terms of generating the desired output can be based on the quality of the prompt.

An example can include a situation in which an image is to be generated that includes an item in a particular setting. For example, a small to medium-sized enterprise (e.g., entity) may need materials to describe its products or services. The enterprise may not have a budget to retain a design company to assist in designing the needed materials. The enterprise may attempt to use some generative technology on their own, but may lack the technical expertise to generate desired materials. For example, the enterprise may use an image generating model to generate marketing materials. However, without the correct prompt, the marketing materials may not include a desired look or not even be the desired output. There can be various reasons that the enterprise may not be able to generate an optimal prompt. For example, the enterprise may be unable to conceptualize or articulate the prompt to cause a generative model to generate the desired output. The enterprise may not have the design expertise to understand the visual elements that should be included in the marketing materials. Therefore, even if the enterprise could write an optimal prompt, the enterprise may not understand the features that should be referenced in the prompt. Another limitation can be the imaginative boundaries of the designers. For example, if an enterprise's designers are not very imaginative, the prompts may produce pedestrian results. Yet another reason can be that the enterprise may not understand that improving the quality of a prompt can result in a generative model outputting the desired materials.

The embodiments herein address the above-referenced issues by providing techniques for generating prompts based on inputs, such as pre-existing documents. The inputs can include, for example, an image of an item and item characteristics in textual form. The inputs can also optionally include user input as to one or more parameters of the desired output. The input can be provided to a multimodal prompt generator that can convert image data and textual data into a prompt. The prompt can be provided to an image generation model that can generate an output based on the prompt. The output can include an image of the item in an appropriate setting. For example, the computing system can receive an image and a textual description of an item. The computing system can include a large language model (LLM) that can receive the input and generate a prompt. In some instances, the LLM can be a multimodal LLM that can receive an input that includes data from different modalities (e.g., textual data, image data, and audio data). Similar to the LLM, the multimodal LLM can generate a prompt. The prompt can indicate the item and a desired setting for the item. The prompt can be provided to an image generating model that can generate an image of the item in the desired setting. For example, the effectiveness of a prompt can be based on whether the prompt includes language that the underlying image generating model has been trained upon. The herein described LLM can generate a prompt based on the language that the image generating model has been trained on. This can result in improving the performance of the image generating model as to generating a desired output.

The embodiments described herein provide several technical advantages over conventional systems. A conventional system may assist to refine a previously generated prompt. However, this requires generation of a candidate prompt for the conventional system to evaluate and refine. This is different than the herein described embodiments, in which a previously generated document that is not a prompt, such as an item description of an image, can be used to generate a prompt for placing an item in a desired setting for an image. As the herein described computing system can generate optimal prompts using an LLM, the image generating model can perform more efficiently based on receiving an optimal prompt over a suboptimal prompt.

FIG. 1 is an illustration 100 of an example system for generating a prompt for an image generating model, according to one or more embodiments. A computing system 102 can receive an input 104 to be used to generate a prompt for generating an image. The input 104 can include data from different modalities. For example, the input can include an image 106 (e.g., an image of an item) and a text 108. The image can include one or more images of the item. In the instance that multiple images are provided, the images can display the item from different angles. The text can include various types of information describing the item. For example, the text 108 can include a title of the item, including a brand name. The text 108 can provide key product features and/or benefits. For example, the text 108 can include bullet points of key features and benefits. The text 108 can include a narrative that describes example uses and other relevant information. The text 108 can further include item options, in terms of available sizes, colors, and quantities. The text 108 can include customer reviews and other feedback related to the item. The text 108 can include a question and answer section that include customer and potential customer questions and corresponding answers. The text 108 can also include an item identifier (e.g., a standardized item identifier value). In some instances, the input 104 can be accessed via a website. For example, the input 104 may be accessible via website of an online marketplace. The input 104 can be structured using a hypertext markup language (HTML) define the layout of the website, includes using tags to structure the image 106 and the text 108. The input 104 can use cascading style sheets (CSS) to define the presentation and styling of the HTML elements. The input 104 can incorporate JavaScript to add interactivity and dynamic behavior to the website, such that the website can respond to a user interaction. For example, a user may click on a hyperlink at the input 104 to reach another webpage. The input 104 may have previously generated without any relation to prompt generation. For example, the input may have been generated by an enterprise to provide information about the item. In fact, the input 104 may have been generated prior to the enterprise being aware of prompts, LLMs, and image generating models.

Based on the input 104, a prompt generation system 110 can generate a prompt to be used to generate an image. The prompt generation system 110 is described with more particularity with respect to FIG. 7. The input 104 can be provided to the prompt generation system 110 and optionally along with user input to determine a set of conditions (e.g., setting, brand identity, item parameters) for generating the prompt. The conditions can act as constraints that guide the LLM to generate the prompt. The prompt generation system 110 can include an LLM that can process the input 104 and generate a prompt. The prompt can include a description of the item, a setting for arranging the item, and other items to be included in the image. In some instances, the enterprise may have a brand identity. For example, an outdoor clothing company may typically generate images and/or videos that show movement (e.g., a river flowing, snow falling) in the outdoors. These images and/or video can be included in the input 104. Therefore, the prompt can further include a brand identity.

The prompt can be provided to an image generation model 112. The image generation model 112 can include various models, such as a diffusion model, a transformer model, a generative adversarial networks (GANs) model, or other appropriate model. The image generation model 112 can be guided by the prompt to generate the output 114. The output 114 can include an image of the item arranged in a desired setting, and optionally include elements of the enterprise's brand identity.

The following example is provided using the FIG. 1. An enterprise may be a detergent manufacturing company. The enterprise may have marketing materials (e.g., input 104) in the form of an item description for detergent pods, as illustrated. The item description may include an image of the detergent pods and a description of the detergent pods. The item description can be provided to the prompt generation system 110. In some instances, the detergent pod description can include descriptive language, such as "fresh' and "sunshine." This information can be used by the prompt generation system 110 to determine a setting for the item. For example, the prompt generation system 110 can be trained to map the language "fresh' and "sunshine" to an outdoors setting. In some instances, the prompt generation system 110 can further take into account a brand identity for detergent pods. In some instances, the computing system 102 can determine a brand identity based on, for example, a webpage. For example, an enterprise may use a website to provide information on one or more items. The computing system 104 can include a web scraper for extracting information from the website. In other instances, the enterprise may have a webpage(s) on an online marketer's website. The computing system 102 can use the web scraper to extract information from the webpage(s). The computing system 102 can further software (e.g., a machine learning model, such as a convolutional neural network (CNN)) to determine the brand identity based on the extracted information. This information can be provided at the time the item description is provided to the prompt generation system 110. In other instances, the prompt generation system 110 can be trained to understand the relationship between the enterprise that manufactures the detergent pods and the brand identity. In this example, the brand identity can be to pair the detergent pods with flowers in any marketing materials.

The prompt generation system 110 can generate a prompt to guide the image generation model 112 to generate an image that includes the detergent pods, in an outdoor setting with flowers. A prompt is described with more particularity with respect to FIG. 6. The image generation model 112 can receive the prompt and generate an image (e.g., output 114) that includes the detergent pods in an outdoor setting with flowers. The enterprise can then use the image for its marketing materials. It should be appreciated that this is an example of any image that can be generated using the herein described embodiments. In other instances, the image may only include a setting and a brand identity elements. For example, a nail manufacturer's brand identity may be to not use images of nails in their marketing materials. For example, the brand identity may be to show images of items inside a home that have been hung using nails without showing the nails themselves. In these instances, the prompt generation system 110 may generate a prompt that instructs the image generation model 112 to generate an image, which includes a qualifier to not include the nails (e.g., "do not include nails"). One having ordinary skill in the art can contemplate other scenarios for different images that can be generated by the image generation model 112.

Figure 2:
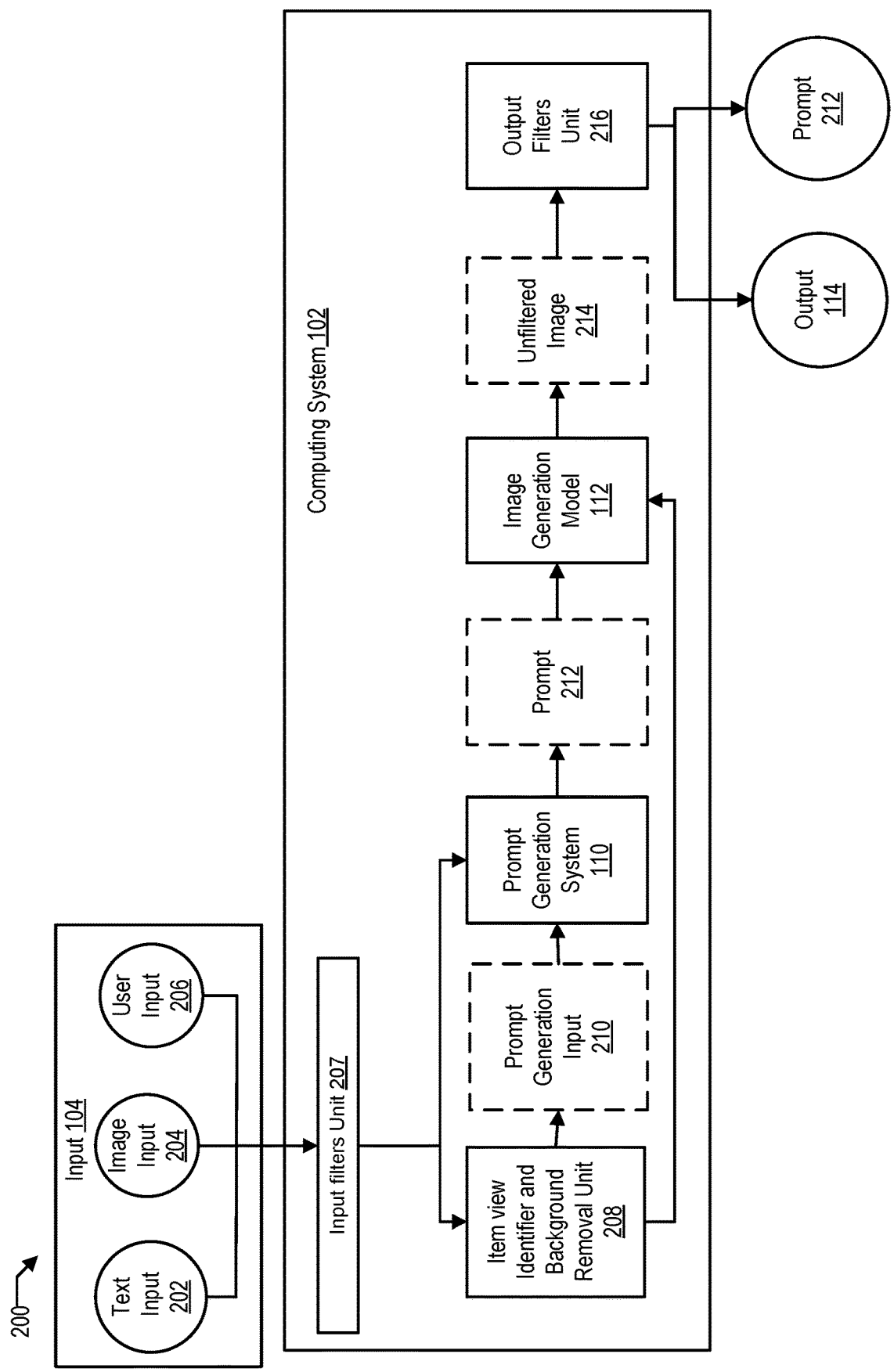
FIG. 2 is an illustration of an example system for generating a prompt for an image generation model, according to one or more embodiments.

FIG. 2 is an illustration 200 of an example system for generating a prompt for an image generation model, according to one or more embodiments. An input 104 can be provided to a computing system 102 for generation of a prompt and an image based on the prompt. The input 104 can include a text input 202, an image input 204, and a user input 206. It should be appreciated that the input is not limited to these inputs. For example, the inputs can include audio inputs and sensory device inputs. The text input 202 can include, for example, a textual description of an item, an item brand, item characteristics (e.g., dimensions, color), an item title, bullet point descriptions of the item, item type, and other appropriate information. The text input can be provided in various formats, such as hypertext markup language (HTML), portable document format (PDF), text file (TXT) word document (DOC or DOCX) or other appropriate format. The image input 204 can be an image of the item. The image can present the item in a point of view (e.g., front facing view, plan view, side view, review view, or other appropriate view). The image input 204 can further present the item in various manners, such as an external view, an exploded view, or an x-ray view of the item. The image can be in various formats, such as joint photographic experts group (JPEG), tagged image file format (TIFF), scalable vector graphics (SVG), or other appropriate format. The user input 206 can include, for example, a theme selection, a custom item image, a custom prompt, a custom item description, an element to be included in the background or other appropriate information. The user input 206 can be used to override a determination by the computing system 102. For example, if the computing system 102 determines a candidate background, the user input 206 can be used to update the candidate background. One or more of the text input 202, the image input 204 and the user input 206 can be provided to an input filters unit 207. The input filters unit 207 can include one or more filters (e.g., image filter, text filter) used to either permit or deny data to pass based on criteria. For example, if the text input 202 includes inappropriate language, personally identifiable information, or other undesired information, the input filters unit 207 can prevent text input 202 from being received by the item view identifier and background removal unit 208 and/or the prompt generation system 110. In some instances, the filters are local to computing system 102. In other instances, the filters can be provided by an external service, such as an image recognition service and a text recognition service.

The output of the input filters unit 207 can be provided to an item view identifier and background removal unit 208. For example, in some instances, the image of the item and the textual description of the item may be included in a single input (e.g., input 104) in which the item may need to be segmented away from the background. In these instances, the item view identifier and background removal unit 208 can use one or more image processing techniques (e.g., thresholding, convolutional neural network (CNN), Mask-R CNN, or other appropriate technique) to segment the item from the background. In addition, the item view identifier and background removal unit 208 can determine an optimal view for the item. For example, the item view identifier and background removal unit 208 can include a model that is trained to determine an optimal view for an item. For example, if the item is a vase, then the model can be trained to determine that a side view of the vase in the optimal view. The item view identifier and background removal unit 208 can generate a prompt generation input 210 that includes a segmented image of the item and an indication of the optimal view. The item view identifier and background removal unit 208 can also output information for generating an image to the image generation model 112.

The output of the input filters unit 207 can also be received by the prompt generation system 110 for generating a prompt for the image generation model 112. The prompt generation system 110 can include an LLM or a multimodal LLM, in the event that the input 104 includes more than a textual data.

The prompt generation system 110 (LLM or multimodal LLM) can be trained to use the textual data (e.g., text input 202), image data (e.g., image input 204), and user data (user input 206) to determine conditions for the prompt. A multimodal model is described with more particular with respect to FIG. 4. The conditions are described with more particularly with respect to FIG. 5. For example, the textual information may indicate that the item is titled the XJ-2000 supreme coffee maker, and the prompt generation system 110 can determine that the name of the item is "coffee maker." The conditions can further include various item and background characteristics, such as, item color, item image, item color, setting, brand identity, background setting, and other appropriate conditions. Each of these conditions can guide the prompt generation system 110 to generate a prompt 212 that takes into account each of these conditions.

The prompt 212 can be provided to the image generation model 112 to generate an image. The image generation model 112 can include various different models (e.g., a diffusion model, a transformer model, a GANs model, or other appropriate model). As an example, the image generation model 112 can be a diffusion model. The diffusion model can process the prompt and encode the prompt 212 into an encoding that includes a numerical representation of the prompt 212. The diffusion model can generate an initial image or use a previously generated initial image, this image can be iteratively modified over a series of steps to generate the image (e.g., output 114). The diffusion model iteratively uses the prompt 212 and a current state of the image to generate a portion of the image at each step. The portion of the image that is generated can be guided by the conditions determined by the prompt generation system 110. The diffusion model can continue to perform the steps until an image has been generated. It should be appreciated that in some instances, a randomization has been introduced into the prompt 212. For example, one or more conditions may include an arrangement of the item in the image. The randomization may cause the items to be arranged at different positions (e.g., right side, left side, top, bottom) in the image. In this sense, if two users each wanted an image of a coffee maker in a rustic setting, the images generated by the diffusion model can be different.

In some instances, the image generated by the image generation model 112 can be an unfiltered image 214. For example, in some instances, in addition to the quality image, the enterprise that is generating the image may have some quality control specifications that may need to be enforced by an output filters unit 216. The output filters unit 216 can analyze the unfiltered image 214 for various characteristics (e.g., aspect ratio, contrast brightness, text, watermark, aesthetic, object, or other appropriate characteristic). For example, the output filters unit 216 can determine whether a human was included in the image, whether a certain color palette was used to generate the image, whether a desired setting was used, an image resolution, an image shape (e.g., portrait or landscape) or other appropriate filter. If the unfiltered image 214 includes one or more prohibited characteristics, the output filters unit 216 can transmit control instructions to cause the image generation model to generate a new image. Assuming that the unfiltered image 214 does not include any prohibited characteristics, the output filters unit 216 can cause the image (e.g., output 114) to be displayed on a computing device. For example, the computing device can include a user interface for displaying the image. In addition to displaying the image, the output filters unit 216 can cause the prompt 212 to be displayed on the computing device. The user interface can include an editor feature, which a user can use to edit the prompt 212. The editing can include adding to the prompt 212, deleting from the prompt, or modifying the prompt. In this sense, the user can edit the prompt and cause the image generation model 112 to generate a new image based on the edited prompt. For example, if the dimensions of the item cause the item to be displayed too prominently or too sparingly in the image, the prompt 212 can be edited to amend the dimensions of the item.

Figure 3:
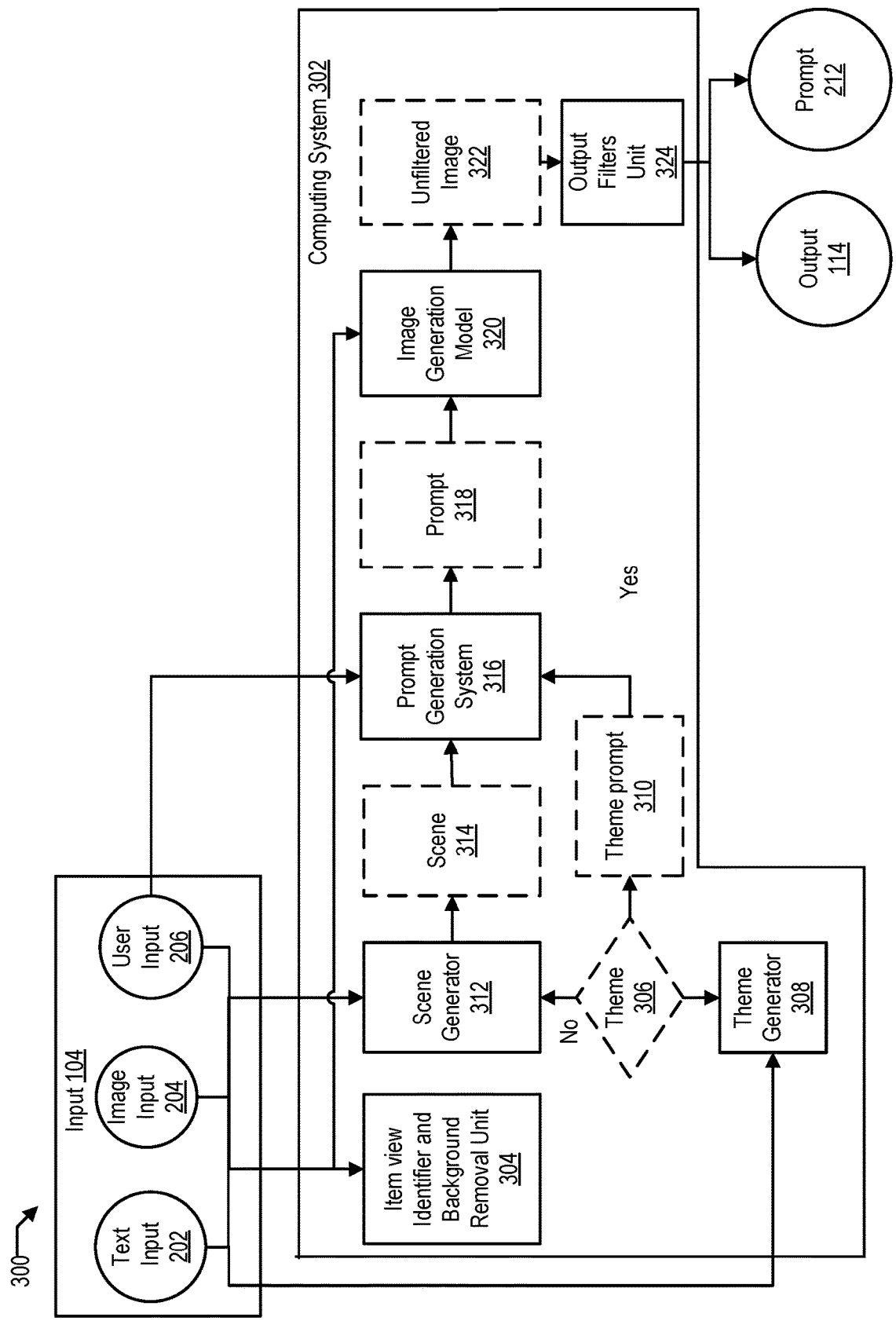
FIG. 3 is an illustration of an example system for generating a prompt for an image generation model, according to one or more embodiments.

FIG. 3 is an illustration 300 of an example system for generating a prompt for an image generating model, according to one or more embodiments. A user can provide input 104 to a computing system 302, which can include one or more of the text input 202, the image input 204, and the user input 206. Although not illustrated in FIG. 3, the computing system 302 can include an input filters unit, that can either permit or deny data to pass based on criteria. The image input 204 can be received by the item view identifier and background removal unit 304 that can process the image input 204 similarly to the item view identifier and background removal unit 208. A user can select a theme have various characteristics (e.g., rustic, Bohemian, festive, underwater, Valentines Day, botanical, or other theme). If the user selects a theme, the theme generator 308 can provide inputs related to the theme 306. For example, the theme generator 308 can determine the item type based on the text input 202 and access images (e.g., second image, third image, . . . , nth image) of items that are the same type and displayed in the selected theme. The theme generator 308 can further extract information, such as item name, item type, item captions, dominant colors from various images. The theme generator 308 can then transmit a predetermined theme prompt 310 that includes one or more predetermined qualifiers to be added to a prompt 318 generated by the prompt generation system 110. If the user has not selected a theme 306, the information can be transmitted to the scene generator 312. In another embodiment, the scene generator 312 can be configured to include qualifiers along with the scene 314 and provide information for the scene 314 and the qualifiers to the prompt generation system 316.

The scene generator 312 can output one or more terms that can be added to a prompt 318 or used to generate terms for adding to the prompt 318. The scene can indicate the layout of the image, including the arrangement of the item, and background items, colors, and other scenic elements. The scene generator can output a second 314 that can include one or more terms to be included in the prompt 318 or used to generate one or more terms to be added to the prompt 318.

Prompt generation system 316 can receive the input 104, the theme prompt, if any, and the scene 314 to generate a prompt. The prompt generation system 216 can generate the prompt 318 similar to how the prompt generation system 110 generates the prompt 212. The prompt can be received by the image generation model 112, which can generate an unfiltered image 322. The image generation model 320 can generate the unfiltered image 322 similar to how the image generation model 112 generates the unfiltered image 214. The unfiltered image 322 can be processed by an output filters unit 324 similar to how the unfiltered image 214 is processed by the output filters unit 216. The output filters unit 324 can output an image (e.g., output 114) that includes the item in the scene and depicted using the theme. For example, the item can be a vehicle and the setting can be a driveway of a large home. If the user has selected a theme, such as a Christmas theme, the vehicle may have a giant red bow tied around the vehicle. The output filters unit 324 can also output the prompt 212. Similar to the computing system 102, a user can edit the prompt 212 and the image generation model 320 can output a new image based on the edited prompt.

Figure 4:
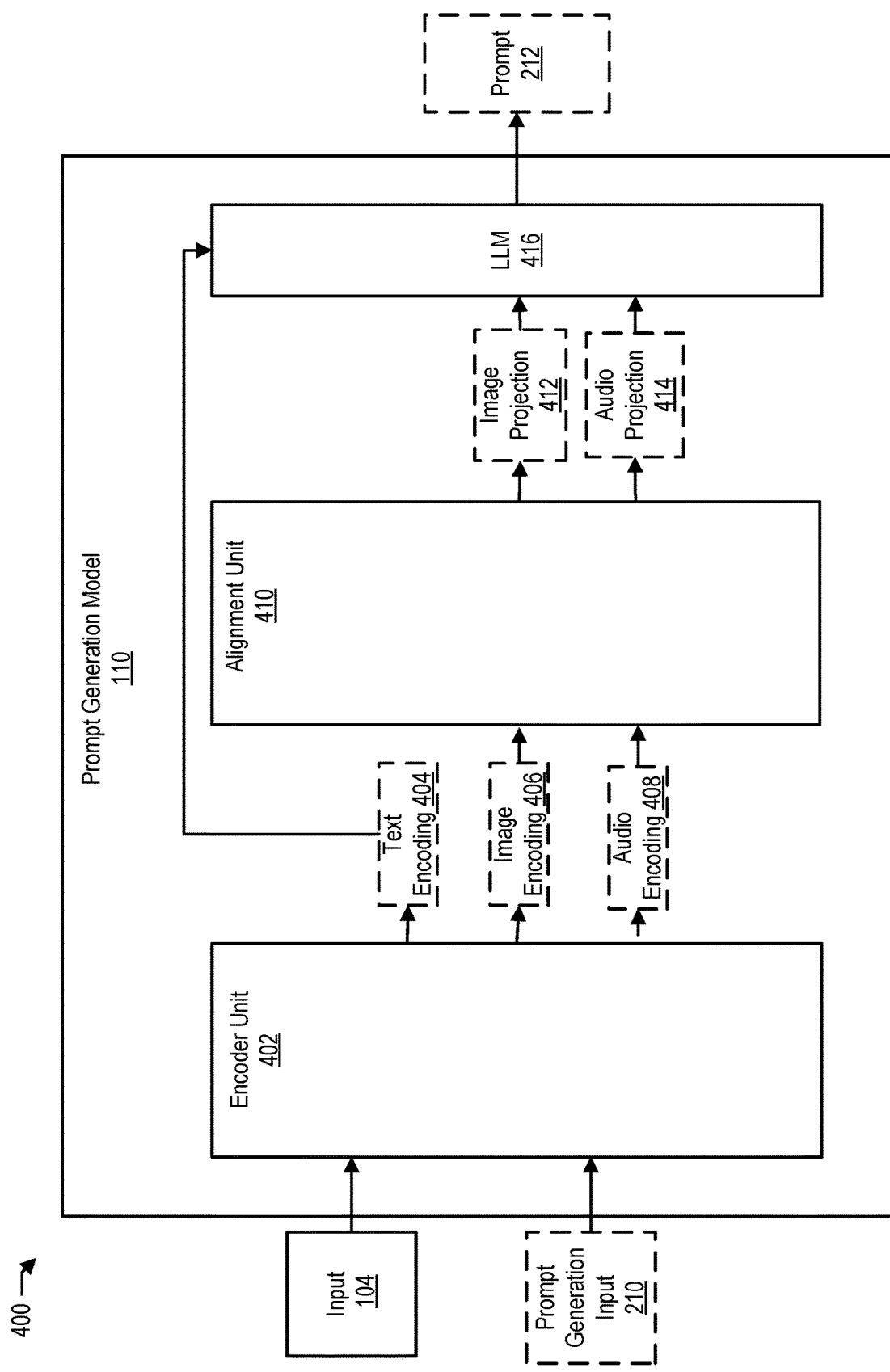
FIG. 4 is an illustration of an example prompt generation system, according to one or more embodiments.

FIG. 4 is an illustration of an example prompt generation system, according to one or more embodiments. As indicated above, the prompt generation system 110 can be used for receiving one or both of an input 104 and a prompt generation input 210 to output a prompt 212. The prompt generation system 110 can include an encoder unit 402 for encoding input information presented in different modalities. The prompt generation system 110 can receive one or both of the input 104 and prompt generation input 210. The input 104 can include one or more of a text input 202, an image input 204, and a user input 206. The encoder unit 502 can include a neural network that is configured to receive the input 104 and convert the input into encodings (e.g., a vector or a tensor). For example, a text encoder (e.g., Word2Vec) can transform a text input 202 into a text encoding 404 that provides semantic meaning to the text. An image encoder (e.g., a convolutional neural network (CNN)) can transform the pixels of an image input 204, including video, to an image encoding 406 that indicates the important features in the image or video. An audio encoder (e.g., a recurrent neural network (RNN)) can transform an audio waveform into an audio encoding 408 that indicates the important features, such as frequency, amplitude, or another feature.

The LLM 416 can be configured to process the text encoding 404, and therefore the text encoding 404 can be transmitted to the LLM 416. The LLM 416 may not be configured to process the image encoding 406 or the audio encoding 408. Each of the image encoding 406 and the audio encoding 408 can be generated in a respective space, such that one encoding may not be in the same space as another encoding. Therefore, the prompt generation system 110 can include an alignment unit 410 for projecting each encoding onto the same space (e.g., a text encoding space). The alignment unit 410 can generate a projection, which is a mapping from one space to another space. As illustrated, the alignment unit 410 can generate an image projection 412 and an audio projection 414. The image projection 412 can include a numerical representation of a caption describing the image input 204. The audio projection 414 can include a numerical representation of the content of the audio input. Each of these projections can map an encoding to a respective numerical representation, in which each numerical representation is in the same space. The numerical representations can be concatenated into an input sequence and used as an input for the LLM 416. It should be appreciated that whether an image encoding 406 or an audio encoding 408 is generated is based on the modality of the information included in the input 104. For example, if there is no audio in the input 104, the encoder unit 402 may not generate an audio encoding 408.

The LLM 416 can analyze the inputs and generate a prompt 212. For example, LLM 416 can include a set of transformer layers, where each layer includes a self-attention mechanism that can assign an importance to different parts of the input sequence. The LLM 416 can further generate the prompt 212 based on the relationships of different parts of the input sequence that were learned at the transformer layers.

FIGS. 5, 6, and 7 are illustrations of a prompt (e.g., prompt 212), where FIG. 6 is a continuation of the prompt illustrated in FIG. 5. FIG. 7 is a continuation of the prompt illustrated in FIG. 6. FIG. 5 is an illustration 500 of an example prompt for image generation, according to one or more embodiments. FIG. 6 is an illustration 600 of the example prompt for image generation, according to one or more embodiments. FIG. 7 is an illustration 700 of the example prompt for image generation, according to one or more embodiments. As illustrated, the prompt 212 indicates that the image is to include an item on a smooth beige sand surrounded by seashells, starfish, and sand dollars in a sandy beach. The prompt further indicates that the image includes a blurry beach landscape with blue water and light sand in the background and soft natural sunlight that is calm and relaxing. Each of these qualifiers (e.g., "smooth beige sand," "seashells," can be derived from, for example, text input 202 and image input 204. In some instances, a user input 206 can override or add to the set of qualifiers determined based on the text input 202 and the image input 204. For example, based on user input 206 the prompt generation system can add a qualifier, remove a qualifier, or modify a qualifier.

The prompt can be generated without a user writing the prompt. Rather, a user can provide the computing system 102 or the computing system 302 with an image of an item (e.g., input 104). The image can include a textual description of the item or the textual description can be provided separately. In some instances, the user can further indicate a setting and a brand identity. In other instances, the user may or may not provide one or both of a setting and a brand identity. For example, a young enterprise may not have established a brand identity yet. In either event, a prompt generation system (e.g., prompt generation system 110 or prompt generation system 316) can be trained to determine an appropriate setting for an item. For example, the training data can be used to teach that an item that is an outdoor riding equipment type should be presented in an outdoor setting, rather than underwater. As the training data can include multiple examples of items and associated settings, the prompt generation system can learn these associations and incorporate the learning into the prompt. With this information, the prompt generation system can generate a prompt for generating an image that presents an item in a setting that is appropriate. For example, it is appropriate for a sofa to be presented in a living room. The training data can further be used to teach the prompt generation system to incorporate a qualifier associated with a brand identity into the prompt. For example, an enterprise's brand identity may be to present images that express a soft natural lighting. The prompt generated by the prompt generation system can include brand identity-associated qualifiers that cause the image generation unit to generate an image with soft natural light. The qualifiers can help further guide the generation of the prompt and consequently the image generated by the image generating model.

Figure 8:
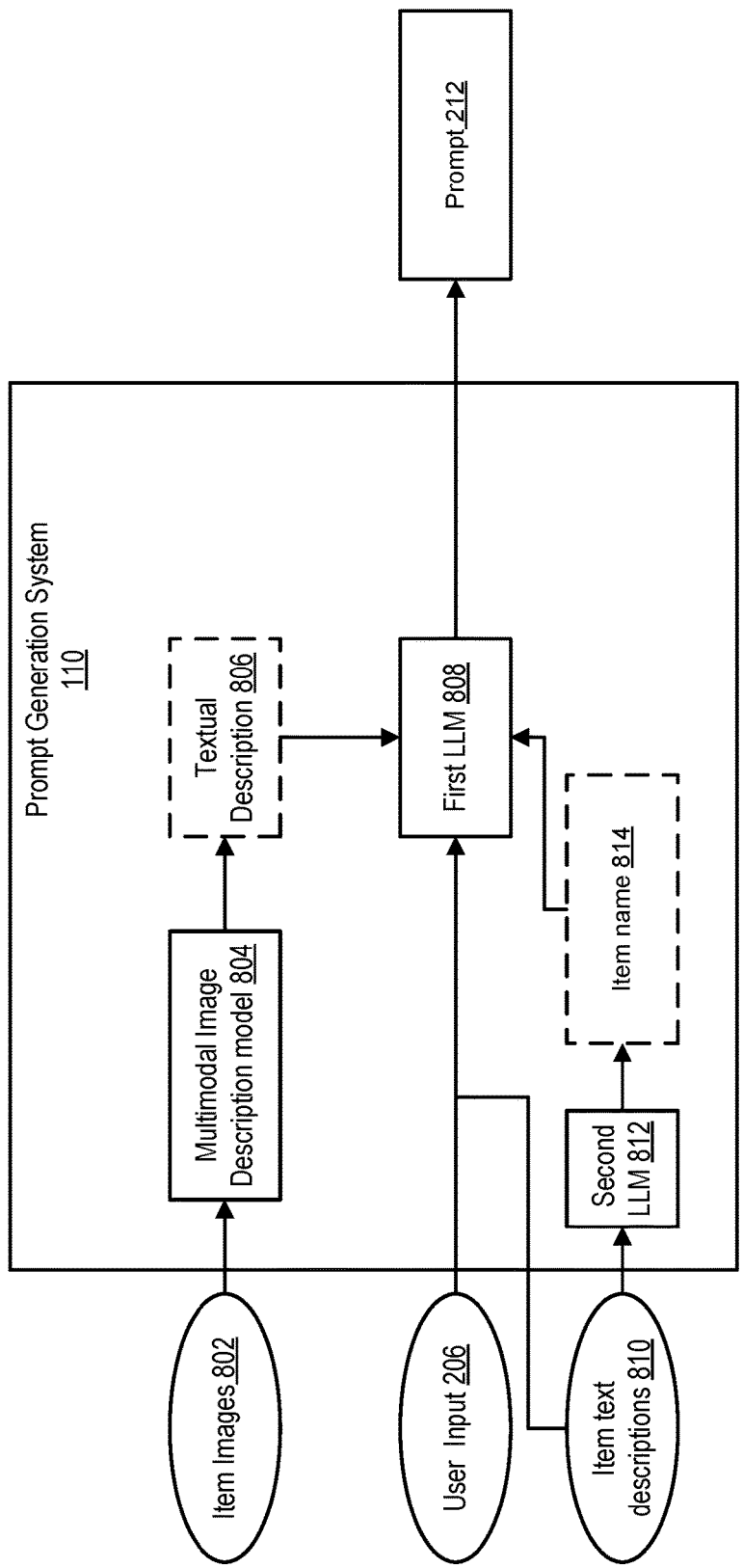
FIG. 8 is an illustration of the example prompt for image generation, according to one or more embodiments.

FIG. 8 is an illustration 800 of an example prompt generation system 110, according to one or more embodiments. It should be appreciated that although the prompt generation system is illustrated at the prompt generation system 110 of FIGS. 1 and 2, the prompt generation system of FIG. 8 can also be the prompt generation system of FIG. 3. The prompt generation system 110 can receive item images 802 (e.g., image input 204) as input to the multimodal image description model 804. The item images 802 can include one or more images of the item. In some instances, a background of the item images 802 is removed via an item view and background removal unit 208. The multimodal image description model 804 can generate a textual description 806 of the item images 802 based on the image features. The textual description 806 can describe characteristics of the item based on the features of the item images. For example, referring back to FIG. 1, the textual description 806 can include terms, such as a rounded container having a cap and writing on the face of the container. The textual description 806 can be provided to a first LLM 808 as an input. Based on the textual description 806, the first LLM 808 can determine various characteristics of the item and the background setting.

The prompt generation system 110 can further receive user input 206 (e.g., a theme, a brand identity, custom qualifiers) as an input to the first LLM 808. The prompt generation system 110 can further receive item text descriptions 810. Referring back to FIG. 1, it can be seen that input 104 includes an image of the detergent pods and an accompanying textual description (e.g., item text descriptions 810) of the detergent pods. The item text descriptions 810 can be received as inputs for the first LLM 808. The item text descriptions 810 can also be received as input to a second LLM 812. The second LLM 812 can be a low-latency LLM trained to determine an item name 814. For example, the second LLM 812 can have fewer parameters than the first LLM 808. The second LLM 812 can have an architecture that incudes fewer layers than the first LLM 808. The second LLM 812 can process the item text descriptions 810 and determine an item name 814 for the item. For example, referring back to FIG. 1, the item name can be "detergent pods." The item name 814 can then be included in the prompt, and an image generating model can generate an image that includes the item name.

The first LLM 808 can further be trained on historical images to determine appropriate settings for an item. For example, during a training session, a multimodal image description model can be provided images of items that are arranged in appropriate settings. The multimodal image description model can generate textual descriptions of the images based on the image features. The textual descriptions can be used as ground truth data for the first LLM 808 during the training phase. For example, the first LLM 808 can be provided items descriptions and be trained to output qualifiers that are appropriate for the item. For example, the item description can be "a set of blue ball point pens." The first LLM 808 can be trained to generate qualifiers that are appropriate to describe a setting for the item. For example, the qualifiers can include: "office setting," "resting on a desktop," or other appropriate qualifier. The historical images can include one or more images of blue ball point pens in appropriate settings. The historical images can further be used as ground truth to measure the accuracy of the qualifiers. Therefore, during an inference stage, when the first LLM 808 receives an item description (e.g., textual description 806), The first LLM 808 can be trained to generate appropriate qualifiers for a prompt.

The first LLM 808 can use the user input 206, the item text descriptions 810, the textual description 806, and the item name 722 to generate the prompt 212. The prompt can be provided to an image generation model (e.g., image generation model 112 or image generation model 320) that can be configured to generate an image based on the prompt 212.

Figure 9:
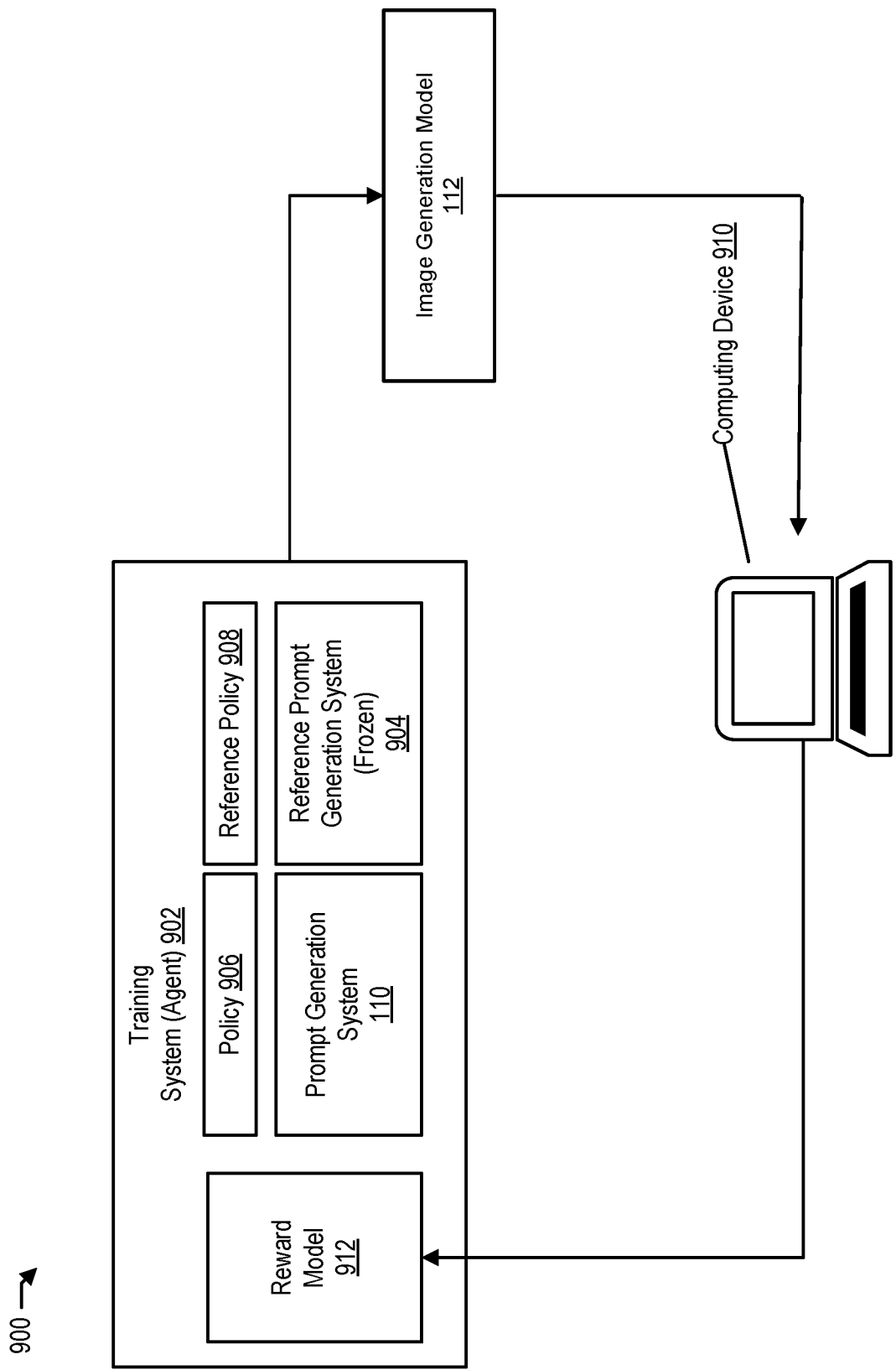
FIG. 9 is an illustration of an example prompt generation system, according to one or more embodiments.

FIG. 9 is an illustration 900 an example of a system for training a prompt generation system, according to one or more embodiments. The prompt generation system can be trained using a variety of techniques. In one instance, a training system 902 can act as an agent in the reinforcement learning process, wherein the training system 902 can employ a prompt generation system 110 and a reference prompt generation system 904 to perform an action to experiment on an environment, receive feedback based on the experimentation, and modify the action based on the feedback. Prior to training, the reference prompt generation system 904 can be a copy of the prompt generation system 110. During training, the weights of the prompt generation system 110 can be adjusted to improve the prompt generating functionality. Furthermore, the weights of the reference prompt generation system 904 can be frozen during training. As the prompt generation system's weights are adjusted, the prompt generation system 110 becomes differentiated from the reference prompt generation system 904. As described herein, the action that the prompt generation system 110 can perform is generating a prompt and causing an image generation model 112 to output an image. The prompt generation system 110 can be trained using historical data to generate the prompt (e.g., prompt 212). In a second stage, the prompt generation system can be fine-tuned using a reinforcement learning technique based on feedback from a human or an artificial intelligence agent (e.g., a GANS network). The reference prompt generation system 904 can have been previously trained to generate appropriate prompts to an input 104. The prompt generation system 110 can be guided by a policy 906, wherein the policy 906 is a strategy used by the prompt generation system 110. The policy 906 can cause the prompt generation system 110 to generate a prompt 212 that results in a maximum reward. The reference prompt generation system 904 can similarly be guided by a reference policy 908.

Each of the prompt generation system 110 and the reference prompt generation system 904 can receive the input 104. The prompt generation system 110 can generate a first prompt using the input and the reference prompt generation system 904 can generate a second prompt using the input 104. The first prompt and the second prompt can separately be transmitted to the image generation model 112 that can generate a first image based on the first prompt and a second image based on the second prompt. The first prompt, the second prompt, the first image, and the second image can be transmitted to a computing device 814 that can present the prompts and images to a human and/or machine learning model(s). The human and/or the machine learning model(s) can provide a positive response score or a negative response score to each prompt. The score can be based on image factors, such as (1) aesthetic quality and (2) fidelity to the prompt. Each factor can receive a respective sub-score and a linear combination can be performed to combine the two sub-scores into a score. The score can also be based on textual factors, such as (1) relevance to the input and (2) grammatical coherence. In some embodiments, the user and or the machine learning model(s) can output individual sub-scores for each factor.

A reward model 912 can rate the quality of the first prompt in relation to a response score (e.g., positive response score or negative response score). For example, if the first prompt results in a response score that is greater than the response score (e.g., reference score) of the second prompt, the reward model can determine that the prompt generation system 110 is to receive a positive reward. If, however, the first prompt results in a lower score than the score (e.g., reference score) of the second prompt, the reward model 816 can determine that the prompt generation system 110 is to receive a negative reward. In response, the weights of the prompt generation model 110 can be adjusted to maximize the opportunity to receive a positive reward in response to a generated prompt. This reinforcement learning training of the prompt generation system 110 can continue until the prompt generation system 110 generates prompts with a positive response at greater than a threshold value.

In another training technique, a training system can include a prompt generation system (e.g., prompt generation system 110) and a reference prompt generation system. Similar to the above, prior to training the prompt generation system can be a copy of the reference prompt generation system. Each of the prompt generation system and the reference prompt generation system can be provided an input (e.g., input 104). The prompt generation system can generate a first prompt and the reference prompt generation system can generate a second prompt. The first prompt can be used by an image generation model to generate a first image. The second prompt can be used by the image generation model to generate a second image. The training system can score the prompts and the images. The score can be based on image factors, such as (1) aesthetic quality and (2) fidelity to the prompt. The score can also be based on textual factors, such as (1) relevance to the input and (2) grammatical coherence. In some embodiments, the user and or the machine learning model(s) can output individual sub-scores for each factor. The result of the score can be that either the first prompt or the second prompt has a higher score. In instances, that the reference prompt generation system generates a second prompt that results in a higher score, the training system can adjust the weights of the prompt generation system to improve the score. If the reference prompt generation system generates a second prompt that results in a lower score than the prompt generation system, then the training system may not adjust the weights of the prompt generation system. This technique does not use a reinforcement learning approach, and therefore, there is no reward model to generate a reward.

Some or all of the process 900 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 10:
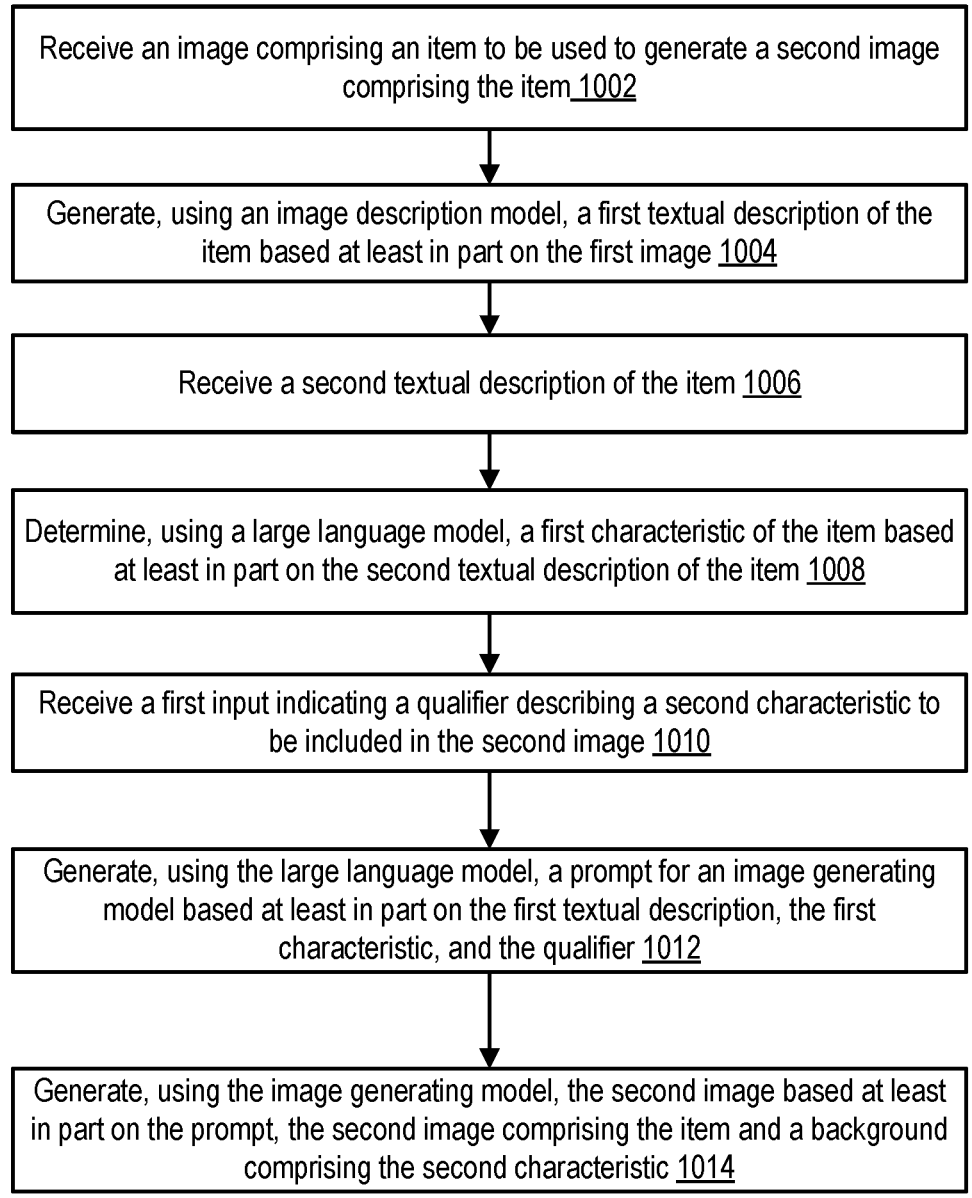
FIG. 10 is an illustration an example of a system for training of a prompt generation system, according to one or more embodiments.

FIG. 10 is a process flow 1000 for generating a prompt for an image generating model, according to one or more embodiments. At 1002, the method can include receiving an image comprising an item to be used to generate a second image comprising the item. The computing system (computing system 102 or 302) can include prompt generation system and an image generation model. The image can be an input (e.g., input 104) and be part of an item description.

At 1004, the method can include the computing system generating, using an image description model, a first textual description of the item based at least in part on the first image. The image description model can convert locks of pixels in the image into encodings. The encodings can further be used to derive a semantic meaning from various elements of the image. The first textual description can be a caption that describes the image.

At 1006, the method can include the computing system receiving a second textual description of the item. The image and the second textual description and be part of an item description (e.g., input 104 of FIG. 1). The computing system can be a multimodal computing system such that the system can process data presented in different modalities.

At 1008, the method can include the computing system determining, using a large language model, a first characteristic of the item based at least in part on the second textual description of the item. The computing system can use a large language model to analyze the second text description can determine one or more characteristics (e.g., color size, type) of the item, including the first characteristic.

At 1010, the method can include the computing system receiving a first input indicating a qualifier describing a second characteristic to be included in the second image. A user can desire that a final image be in a certain setting (e.g., Christmas, outdoors, water, indoors) and can provide an input to select a desired setting.

At 1012, the method can include the computing system generating, using the large language model, a prompt (e.g., prompt 212) for an image generating model based at least in part on the first textual description, the characteristic, and the qualifier. The prompt can be used to guide the image generating model.

At 1014, the method can include the computing system generating, using the image generating model, the second image, based at least in part on the prompt, the second image comprising the item and a background comprising the second characteristic.

Figure 11:
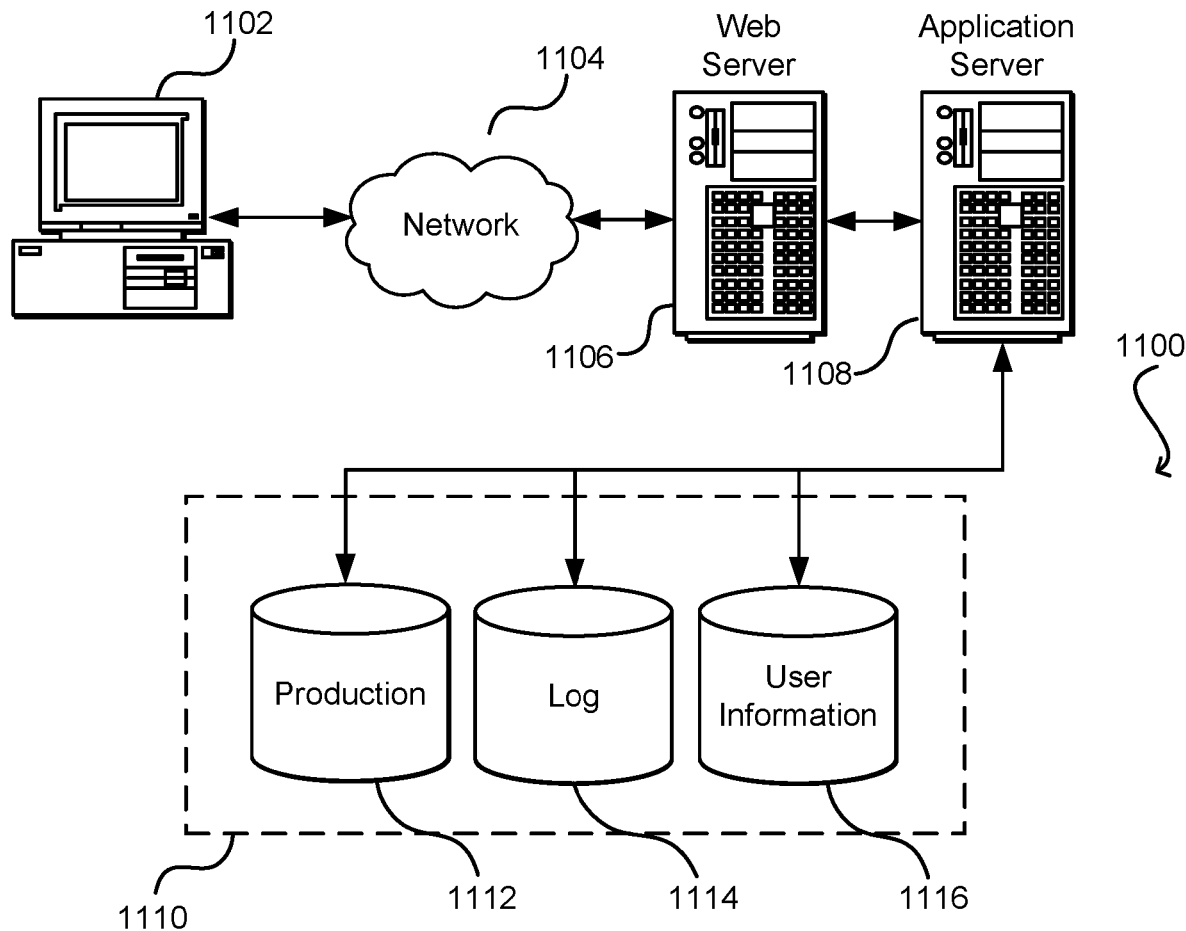
FIG. 11 illustrates an environment in which various embodiments can be implemented.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving a first image showing an item to be used to generate a second image comprising the item;
   generating, using a first machine learning model, a first encoding representing a first textual description of the item based at least in part on the first image;
   generating, using a second machine learning model, a second encoding representing a second textual description of the item;
   determining, using a third machine learning model to process the second encoding, a first characteristic of the item;
   receiving a first input indicating a qualifier describing a second characteristic to be represented in the second image;
   generating, using the third machine learning model, a prompt for generating the second image of the item to show the item comprising the first characteristic and a background representing the second characteristic by a fourth machine learning model based at least in part on the first encoding, the first characteristic, and the qualifier; and
   generating, using the fourth machine learning model, the second image based at least in part on the prompt, the second image showing the item and a background representing the second characteristic.

2. The computer-implemented method of claim 1, wherein the item is a first item, wherein the background is a first background, and wherein the method further comprises:
   receiving a second image comprising a second item having a same item type as the first item; and
   generating a third textual description of a second background of the second image, wherein the first background is generated based at least in part on the third textual description of the second background.

3. The computer-implemented method of claim 1, wherein the method further comprises:
   causing the second image to be displayed on a user interface; and
   causing the prompt to be displayed on the user interface.

4. A computing system, comprising:
   one or more processors, and
   one or more computer readable media having stored thereon instructions that, when executed, cause the one or more processors to:
   generate, using a first machine learning model, an encoding representing a textual description of an item shown in a first image;
   determine, using a second machine learning model, a first characteristic of the item based at least in part on processing the first encoding;
   receive a first input indicating a qualifier describing a second characteristic to be represented in a second image of the item;
   generate, using the second machine learning model, a prompt for generating the second image of the item to show the item comprising the first characteristic and a background representing the second characteristic by a third machine learning model based at least in part on the first characteristic and the qualifier; and
   generate, using the third machine learning model, the second image based at least in part on the prompt, the second image showing the item comprising the first characteristic and the background representing the second characteristic.

5. The computing system of claim 4, and wherein the instructions, when executed, further cause the one or more processors to:
   receive the first image comprising the item to be used to generate the second image;
   generate, using an image description model, a second textual description of the item based at least in part on the first image; and
   determine the first input based at least in part on the second textual description.

6. The computing system of claim 5, wherein the instructions, when executed further cause the one or more processors to:
  generate a first numerical representation of the textual description;
  generate a second numerical representation of the second image;
  align the first numerical representation and the second numerical representation into a common space;
  generate an input sequence based at least in part on the aligned first numerical representation and the second numerical representation, wherein the second characteristic is determined based at least in part on the input sequence.

7. The computing system of claim 4, wherein the instructions, when executed, further cause the one or more processors to:
  cause the second image to be displayed on a user interface; and
  cause the prompt to be displayed on the user interface.

8. The computing system of claim 7, wherein the instructions, when executed, further cause the one or more processors to:
  receive an edit of the prompt displayed on the user interface; and
  generate, using the second machine learning model, a third image based at least in part on the edit, the third image comprising the item in the background arranged differently than an arrangement of the item in the second image.

9. The computing system of claim 4, wherein the background is a first background, and wherein the instructions, when executed, further cause the one or more processors to:
  receive the first image comprising the item and a second background;
  segment, using a convolutional neural network, the item from the second background; and
  generate a third image comprising the item with the second background removed, wherein the prompt is based at least in part on the third image.

10. The computing system of claim 4, wherein the item is a first item, wherein the textual description is a first textual description, wherein the background is a first background, and wherein the instructions, when executed, further cause the one or more processors:
  receive a third image comprising a second item having a same item type as the first item; and
  generate a second textual description of a second background of the third image, wherein the first background is generated based at least in part on the second textual description of the second background.

11. The computing system of claim 4, wherein the instructions, when executed, further cause the one or more processors to:
  access a selection of a theme to be incorporated into the theme;
  access a database comprising the qualifier associated with the theme; and
  transmit the qualifier to the first machine learning model, wherein the prompt comprises the qualifier.

12. The computing system of claim 4, wherein the instructions that, when executed, further cause the one or more processors to:
  receive an indication of a brand identity for an entity associated with the item;
  access a database comprising the qualifier associated with the brand identity; and
  transmit the qualifier to the first machine learning model, wherein the prompt comprises the qualifier.

13. The computing system of claim 4, wherein the instructions, when executed, further cause the one or more processors to:
  process the second image using a filter;
  adjust a third characteristic of the second image based at least in part on the filter; and
  display the second image with the adjusted third characteristic on a user interface.

14. The computing system of claim 4, wherein the prompt comprises a first qualifier, and wherein the instructions, when executed, further cause the one or more processors to:
  receive a third image comprising the item to be used to generate the second image;
  generate, using an image description model, a second textual description of the item based at least in part on the third image;
  determine a second qualifier based at least in part on the second textual description; and
  include the second qualifier into the prompt.

15. The computing system of claim 4, wherein the instructions that, when executed, further cause the one or more processors to:
  receive a user-based indication of an element to be included in the background; and
  generate the background to include the element.

16. The computing system of claim 4, wherein the item is a first item, wherein the background is a first background, and wherein the instructions, when executed, further cause the one or more processors:
  receive a third image comprising a second item having a same item type as the first item;
  generate a second textual description of a second background of the third image;
  generate a candidate background based at least in part on the second textual description;
  receive a user-based indication of an element to be included in the background;
  determine the background based at least in part on incorporating the element into the candidate background.

17. One or more non-transitory computer-readable media, having stored thereon instructions that, when executed by one or more processors of a computing system, cause the computing system to at least:
  receive an encoding representing a textual description of an item;
  generate, using a first machine learning model, a prompt for generating an image of the item by a second machine learning model based at least in part on processing the encoding;
  generate, using the second machine learning model, an image of the item based at least in part on the prompt;
  determine a score based at least in part on a relevance of the prompt to the textual description of the item; and
  adjust a weight of the first machine learning model based at least in part on the score.

18. The one or more non-transitory computer-readable media of claim 17 wherein the instructions, when executed by the one or more processors, further cause the computing system to at least:
  process a first sub-score, associated with an aesthetic quality of the image, and a second sub-score associated with fidelity of the image to the prompt, wherein the score is determined based at least in part on the first sub-score and the second sub-score.

19. The one or more non-transitory computer-readable media of claim 17 wherein the instructions, when executed by the one or more processors, further cause the computing system to at least:
- compare the score to a reference score; and
- determine to adjust a weight of the first machine learning model based at least in part on whether the score is greater than or less than the reference score.

20. The one or more non-transitory computer-readable media of claim 17 wherein the instructions, when executed by the one or more processors, further cause the computing system to at least:
- compare the score to a reference score;
- generate, using a reward model, a reward for the first machine learning model based at least in part on whether the score is greater than or less than the reference score; and
- adjust a weight of the first machine learning model based at least in part on whether the score is greater than or less than the reference score.

\* \* \* \* \*